Figure 1:
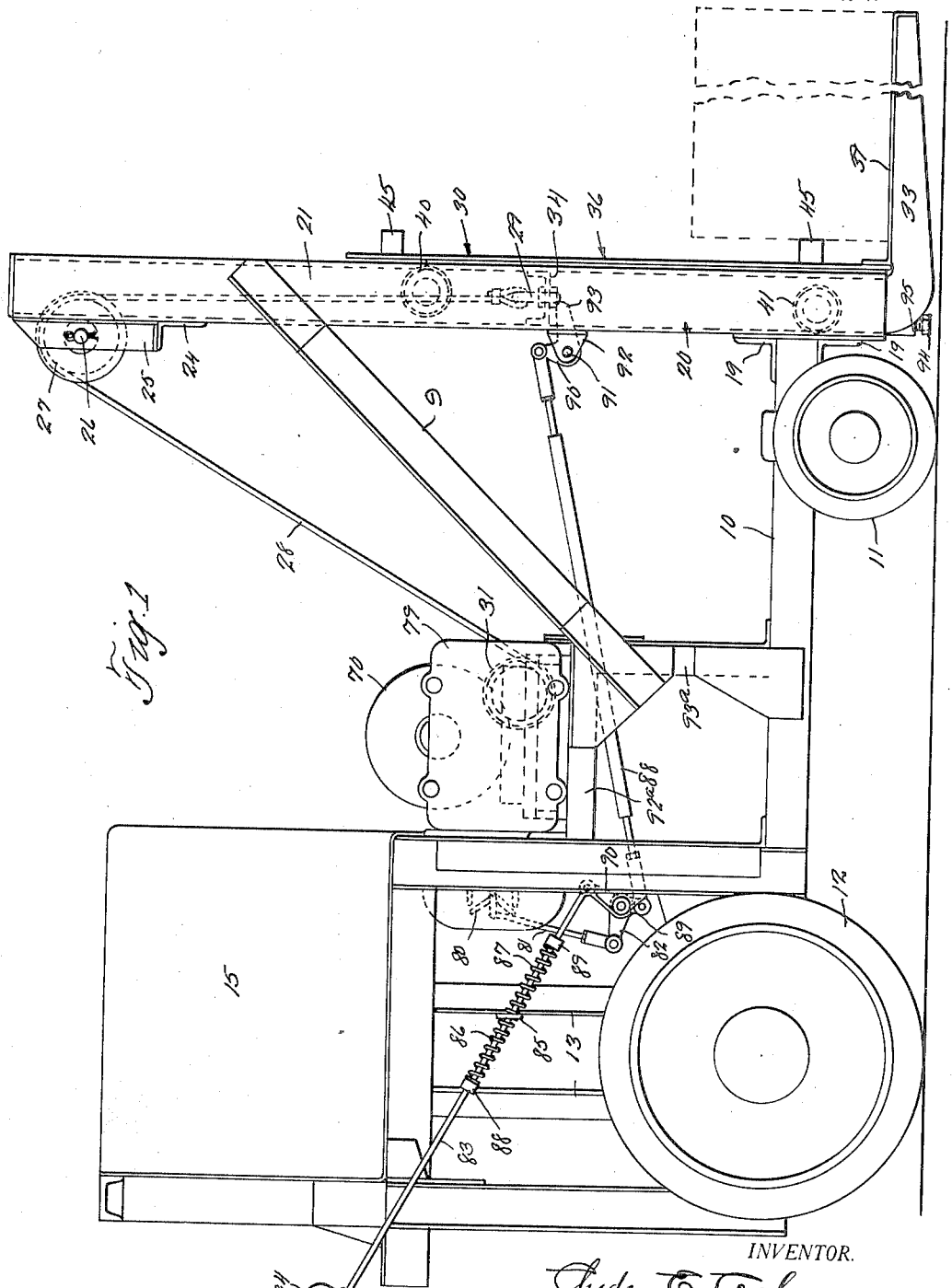

C. E. COCHRAN.
INDUSTRIAL TRUCK.
APPLICATION FILED SEPT. 27, 1919.

1,399,543.

Patented Dec. 6, 1921.
5 SHEETS—SHEET 1.

INVENTOR.
Clyde E. Cochran,
BY
Baker & Macklin,
ATTORNEYS.

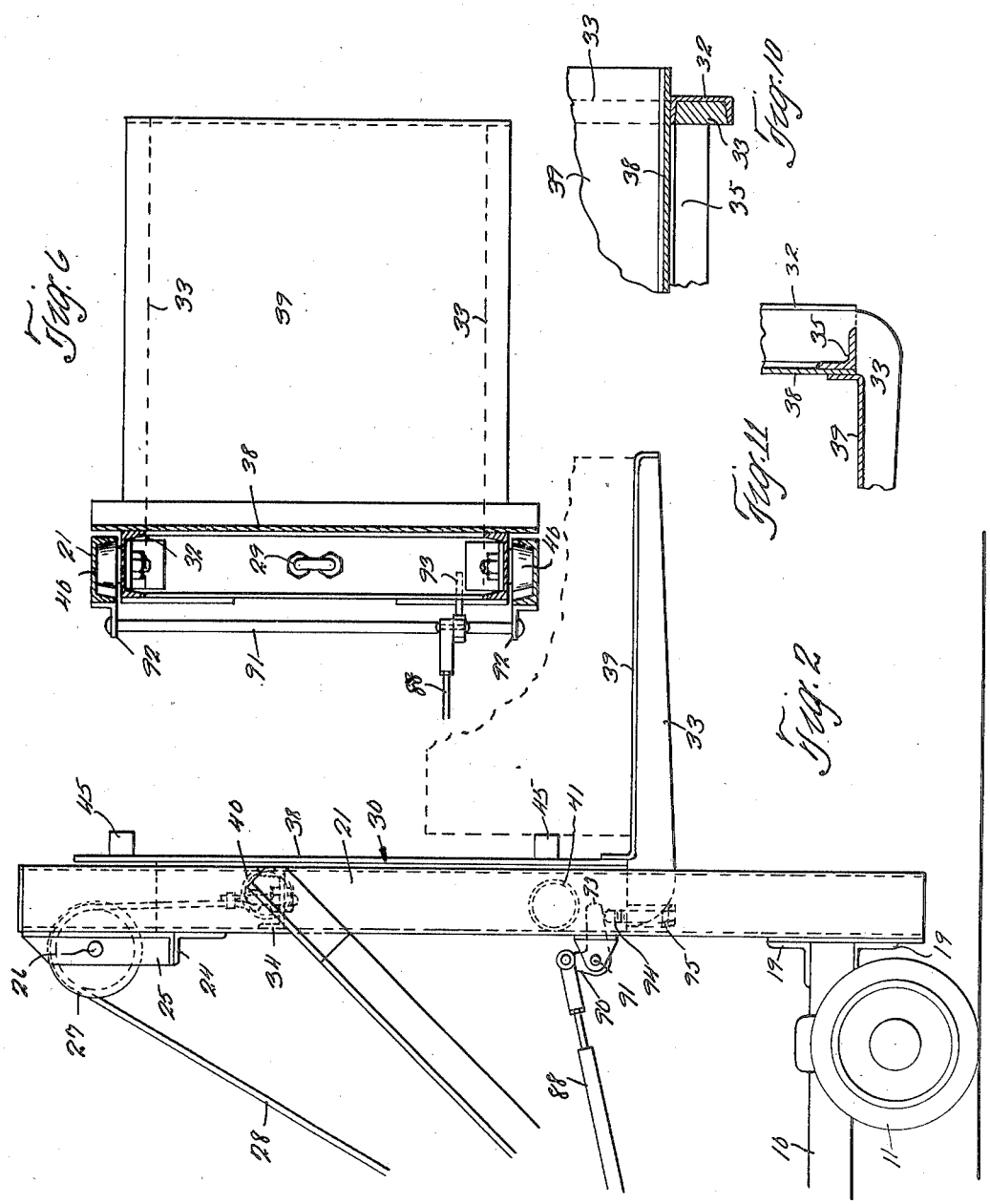

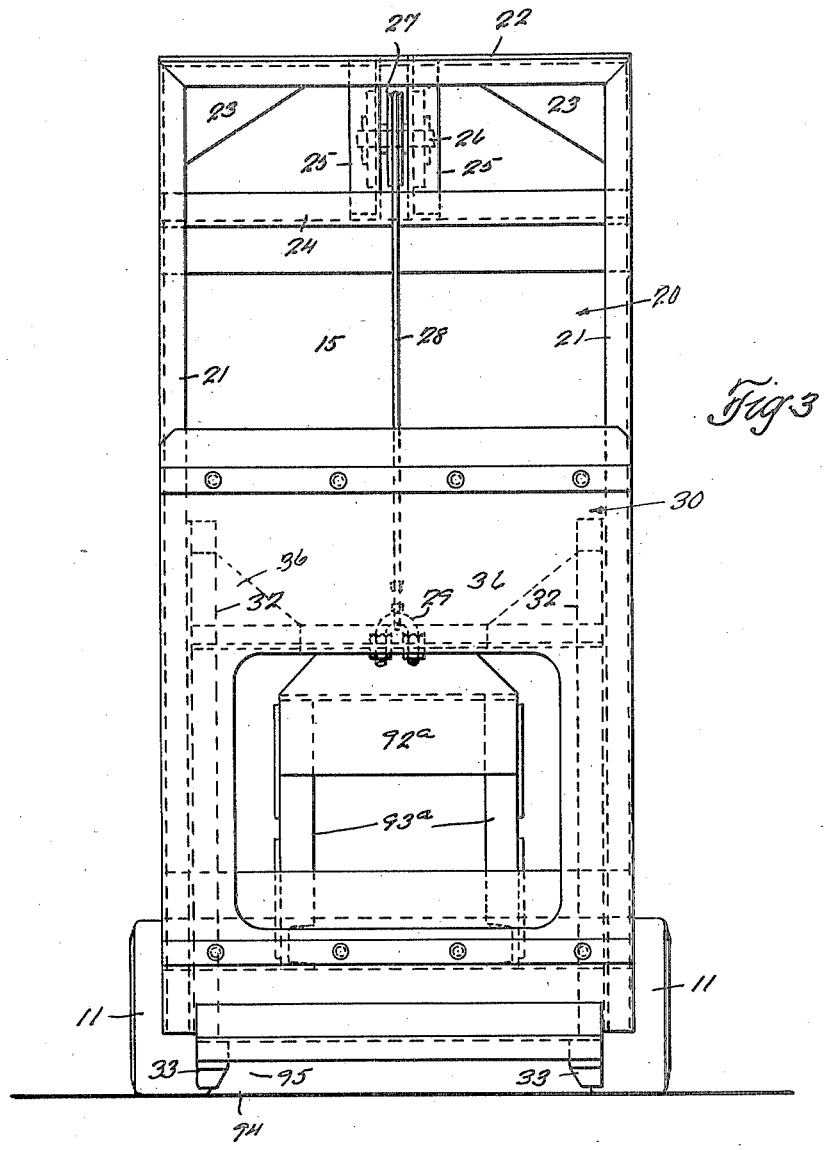

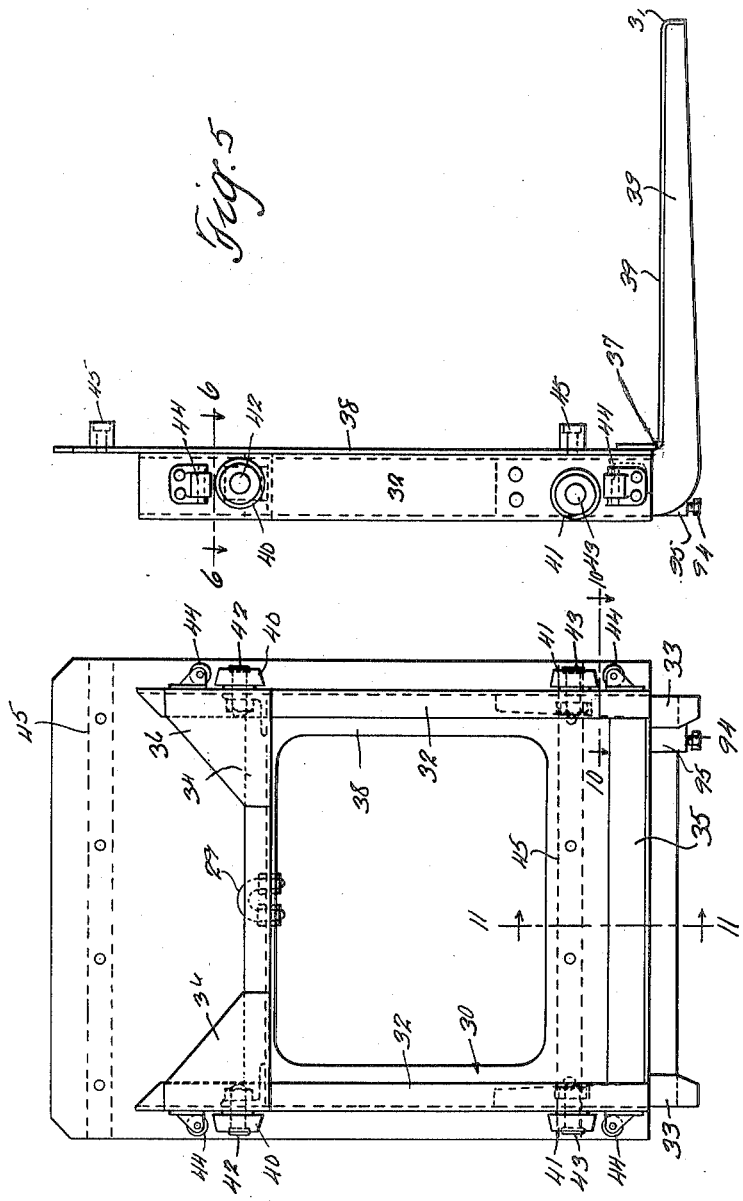

C. E. COCHRAN.
INDUSTRIAL TRUCK.
APPLICATION FILED SEPT. 27, 1919.
1,399,543.
Patented Dec. 6, 1921.
5 SHEETS—SHEET 5.
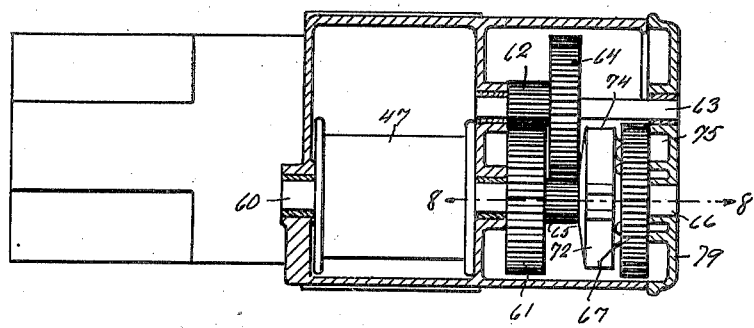
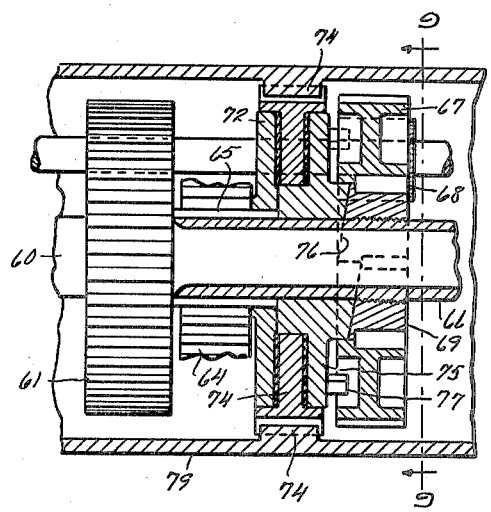
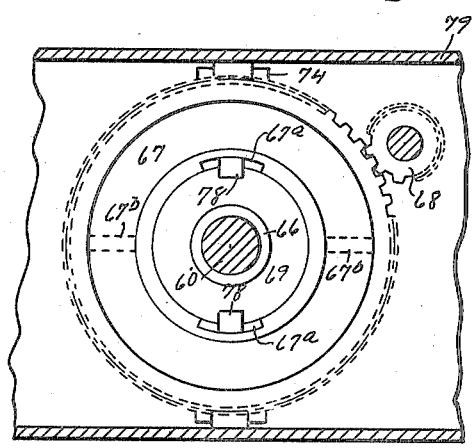
INVENTOR.
Clyde E. Cochran,
BY
Baker & Macklin,
ATTORNEYS.

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

1,399,543.　　　　　　Specification of Letters Patent.　　Patented Dêc. 6, 1921.

Application filed September 27, 1919. Serial No. 326,789.

*To all whom it may concern:*

Be it known that I, CLYDE E. COCHRAN, a citizen of the United States, residing at Cleveland, in the county of Cuyahoga and State of Ohio, have invented a certain new and useful Improvement in Industrial Trucks, of which the following is a full, clear, and exact description, reference being had to the accompanying drawings.

This invention relates to an automobile truck provided with a mechanism for receiving a load, transporting it, and after transportation depositing it. The general object of the invention is to provide a simple and efficient power mechanism for receiving the load, raising or lowering it, transporting it and readily depositing it under the accurate control of the operator. More particularly my invention provides a truck equipped with a flexible raising member extending over a suitable sheave carried by the upper end of a substantially rectangular frame rigidly secured at its lower end to one end of the truck frame, the flexible member being connected to a platform which is adapted to receive and transport a load and raise or lower it to any desired elevation within the limit of the mechanism. My invention may be embodied in a truck for use in a freight or storage house, where loads have to be received from trucks, wagons or the like, transported and then deposited on the floor, or vice versa, and the characteristics of the invention especially adapted for this use are also embodied within the protection herein claimed.

The above features, and others, contributing to the efficiency of the mechanism, are hereinafter more fully explained in connection with an improved embodiment shown in the drawings.

In the drawings Figure 1 is a side elevation of the truck with the parts in a position for receiving a load from the floor; Fig. 2 is a fragmentary side elevation of the rear end of the truck showing the parts in a position for receiving or depositing the load from or on a wagon, truck, raised platform or the like; Fig. 3 is a rear elevation of the truck and frame, complete; Fig. 4 is a front elevation of the lifting platform removed from the truck; Fig. 5 is a side elevation of Fig. 4; Fig. 6 is a horizontal section taken as indicated by the line 6—6 of Fig. 5; Fig. 7 is a detail in horizontal section illustrating a winding mechanism which may be employed; Fig. 8 is a vertical section taken on the line 8—8 of Fig. 7; Fig. 9 is a transverse section taken on the line 9—9 of Fig. 8; Figs. 10 and 11 are sections on the lines 10—10 and 11—11 respectively, of Fig. 4.

As shown in Fig. 1, 10 indicates the frame or body of the truck which is supported by rear wheels 11 and forward wheels 12. The forward wheels are on opposite sides of a front housing 13 composed of upright and transverse members secured to the frame member 10. This housing may carry a suitable motor, not shown, for rotating the front wheels and these may be steered by any mechanism, not shown. On the upper part of the front housing is a space 15 suitable for a storage battery for driving the truck, and this same battery may be availed of for operating the cable winding mechanism hereinafter described.

The construction of the frame, wheels, housing, etc., above mentioned, does not enter into the present invention. They may, if desired, be formed according to Patent No. 1,260,145, granted March 19, 1918, to the Elwell-Parker Electric Company as assignee of Clyde E. Cóchran.

In the present invention, I rigidly secure to the rear end of the truck frame 10, a substantially rectangular frame 20. This is composed of suitable approximately upright members 21 shown as inwardly facing channel beams having their lower ends fastened to the extreme rear of the truck frame 10, as by angle bars 19, and their upper ends connected by a downwardly facing channel bar 22 and angle clips 23. The upright frame is suitably braced to the truck, preferably by two angle bars 9 secured at one end near the middle of the truck frame and extending diagonally upward with the opposite ends secured to the upright members 21.

Fastened to the front face of the upright members 21, a short distance below and parallel to the cross beam 22 is an angle iron 24, to which is connected the lower ends of two parallel vertical angle bars 25, their upper ends being secured to the cross beam 22.

Journaled in the vertical bars 25, is a transverse shaft 26 on which is mounted a sheave 27. Over this sheave extends a cable 28, having one end secured to a hook 29 on a movable platform 30, which is slidably mounted in the frame 20, and the other end attached to some suitable winding drum, as illustrated in dotted lines at 31 in Fig. 1.

The platform 30 is made up of two vertical inwardly facing channel bars 32, to which are attached the forwardly projecting arms 33. These bars 32 are connected by cross bars 34 and 35, the upper bar 34 carrying the hook 29 to which the cable 28 is attached. Gusset plates are secured to the forward flanges between the upper ends of the bars 32 and the cross bar 34. A plate 38 is riveted or otherwise secured to the rear faces of the channel bars 32 and a plate 39, the forward edge being bent upwardly at 37 and the rear edge downwardly at 37, is secured to the upper surfaces of the arms 33. Bumpers or spacing bars may be provided on the platform 30, two being shown at 45 horizontally secured near the upper and lower edges of the plate 38.

Upper and lower rollers 40 and 41 are carried by stub shafts 42 and 43 which are rigidly fastened to the channel bars 32.

The platform 30 is mounted in the frame 20, the rollers 40 and 41 running in the groove formed by the flanges of the channel bars 21, the upper rollers 40 riding on the inner face of the rear flanges, and the lower rollers 41 riding on the inner face of the forward flanges, and is raised and lowered under control of the cable 28 and the drum 31. Small rollers 44, mounted on the channel bars 32 at right angles to the rollers 40 and 41, ride against the inner faces of the webs of the channel bars 21, and guide the platform laterally.

Any suitable winding mechanism may be provided for pulling in or paying out the cable 28. We find it very convenient to use an electric switch for this purpose which provides a winding drum, a motor geared to it, and suitable mechanism making the device self-locking whenever the motor rotation stops but enabling the winding in at will and also the paying out of the cable whenever desired by rotating the drum in the unwinding direction faster than gravity tends to rotate it.

A convenient form of winding mechanism as above outlined is illustrated in Figs. 7, 8 and 9, where the winding drum 31 is on a shaft 60 which carries a spur gear 61 meshing with a pinion 62 on a shaft 63. A spur gear 64 on this shaft meshes with a pinion 65 on a sleeve 66 which is loose on the shaft 60. Surrounding the sleeve 66 is a spur gear 67 which is connected with the sleeve by means allowing independent movement for only a fraction of a rotation. This gear 67 meshes with a pinion 68 on an extension of the armature shaft of a motor 70.

Between the gear 67 and the pinion 65 is a friction brake effective whenever the raising rotation stops. This consists, as shown, of a disk 72 rigid with the sleeve 66, an annular friction member 74 alongside of the disk and held stationary by engagement with the casting 79 of the winding mechanism and an annular clamping member 75 on the other side of the friction member 74 and loosely splined on the sleeve and having on its outer side a face cam 76. This cam is adapted to be abutted by a complementary cam 69 which is rigid on the sleeve 66 and has a portion standing within the spur gear 67. The gear 67 has notches 67ª, Fig. 9, which are occupied by lugs 78 on the cam member 69 to allow some freedom of movement between the gear and the cam member. After this freedom is taken up in the raising rotation of the gear the gear drives the cam member 69, and this, by reason of the direction of the inclines, frees the brake member 75 from braking friction and positively carries it around by reason of the engagement of the shoulders on the two cams.

It will be seen therefore, that in the raising direction the mechanism provides first for relieving the brake and then for furnishing a direct train of spur gearing between the armature and the raising drum. When the raising rotation ceases the tendency of the load is to rotate the train of gears in the opposite direction, and as the gear 67 moves in the backward direction the brake member 75 lags behind it so that the brake becomes applied, by reason of the inclined action of the cams, and the load is held.

To lower the load the armature is simply driven in the reverse direction from the raising movement. This turns the gear 67 backwardly faster than the load would turn it, and in this movement webs 67ᵇ on the gear engage lugs 77 on the cam member 75 and carry it around so that the brake is not applied. The engagement of the webs 67ᵇ with the lugs 77 takes place before the other ends of the notches 67ª engage the lugs 78. Whenever this lowering rotation of the armature stops the tendency of the load to pull the train of gearing applies the brake, as already described.

It will be realized from the above description that the device illustrated is self-locking whenever the motor rotation ceases, whether it has been raising or lowering the load. It is to be understood, however, that the winding mechanism so illustrated and described is simply set out by way of illustration, as any self-winding mechanism may be used. The particular winding mechanism shown is on the market as a unit and is believed to be manufactured under Patent No. 1,020,014, granted March 12, 1912, to G. A. Armington, to which reference may be made for fuller description of it.

As one of the uses of the present truck is for handling extremely heavy loads, it is desirable to provide an automatic mechanism to stop the upward movement of the platform when the limit of that movement is attained. It is desirable also to have the mechanism under constant control of the operator for lowering the platform so that it may be deposited gently upon the floor. We provide a simple mechanism for effecting these results which is shown in Figs. 1 and 2 and will now be described.

80 indicates a suitable double-pole knife switch adapted to direct a current in either direction to the raising motor 70, the bottom position of the switch being for raising and the top position for lowering and there being an intermediate neutral position. This switch is operated by a push and pull rod 81 which is connected to a bell crank 82, the other arm of which is connected to a rod 83 which carries an operating handle 84. The rod 83 slides loosely through a stationary bar 85 and has helical springs 86 and 87 around it, one end of each of these springs bearing against the bar 85 and the other end against the lugs 88 and 89 which are rigidly fastened to the rod 83. As these springs 80 and 87 are in constant pressure against the bar 85 and the lugs 88 and 89 they tend to keep the switch 80 in a neutral position so that continued upward or downward movement of the platform 30 can only be attained by constant pull or push on the handle 84 by the operator. The knife switch is swung into raising position by an outward pull on the handle 84 which causes a downward pull on the rod 81. This same movement shoves rearwardly on a push rod 88 which has one end connected with a short arm 89 depending from the bell crank 82 and the other end connected to the vertical arm of a bell crank 90 mounted on a shaft 91 which is journaled in brackets 92 fastened to the channel bars 21 of the upright frame 20. This in turn causes the forward arm 93 of the bell crank to be lowered. To start the raising operation, the operator simply holds out the handle 84. The motor now operates, winding up the cable 28, lifting the platform 30.

As the platform comes into its final position as shown in Fig. 2, the adjustable screw 94 mounted in a boss 95 on one of the arms 33, abuts the horizontal arm of the bell crank and throws the switch into neutral position. This opens the current to the motor and the self-locking winding mechanism retains the load in such position.

To lower the load the operator holds the handle 84 in against the force of the springs 86 and 87. In this movement the rod 81 swings the knife switch 80 into its upper engagement to direct the current in reversing direction to the motor which thus causes the motor to pay out the cable 28, the load being lowered as long as the handle is held in. Whenever the operator relieves the force on the handle the springs 86 and 87 restore the handle to its neutral position which swings the switch open and stops the motor 70 and the self-locking winding mechanism holds the load. This insures the load being lowered under the constant control of the operator. When the platform reaches its lowermost position the cross piece 34 strikes the arm 93 which operates the rod 88, the bell crank 82 and the rod 81 which in turn operates the switch 80, thus preventing the platform 30 from forcibly striking the floor under the weight of the load.

As will be seen by the foregoing description, to elevate or lower the platform, the operator must constantly hold the handle 84 in or out. It will also be apparent that the platform can be stopped anywhere between the limits of its lowermost and uppermost position. The automatic mechanism just described operates only to prevent the platform from being raised or lowered beyond either one of these limits and thus insuring that no damage will be done to the truck, such as breaking a cable or distorting the frame 20 by trying to raise the load above its uppermost limit, or by injuring the platform or the load by allowing it to drop forcibly on the floor or ground.

By mounting the upright frame members 21 at the extreme rear of the truck frame 10, the vertical trackways formed thereby may extend below the truck body and wheel axles so that the movable platform 30 may be lowered to the floor or ground regardless of the size of the truck wheels. By means of this construction the truck wheels may be made as large as desired for facility in transportation without affecting the ability to lower the platform 30 clear to the ground, and also enables this platform when elevated to overhang the rear portion of the truck and engage closely the fixed raised platform or other surface which it is desired to approach even though the base of such raised platform projects outwardly toward the truck wheels.

I claim:

1. The combination with a truck, of an upright frame secured at one extreme end thereof, a load supporting member movably carried by the frame, hoisting means for said member, said means being carried near the center of the truck, and a power unit rigidly supported on the other extreme end of the truck.

2. The combination with a truck, of a low height platform thereon, an upright frame secured at one end of said platform, a platform supported within the frame and adapted to be moved vertically therein, raising mechanism for moving said last mentioned platform, said mechanism being positioned intermediate the ends of said truck and means for supporting the raising mechanism above the truck platform.

3. The combination with a truck, of an upright frame rigidly secured at the extreme rear end thereof and extending below the truck wheel axle, said frame constituting vertical guideways, a load receiving member having vertical and horizontal portions, an engaging member on said vertical portion, means for moving said load-receiving member along said guideways and means carried by the frame and projecting into the path of the load receiving member intermediate the top and bottom portions thereof for disconnecting the load moving means.

4. The combination with a truck, of an upright frame at one end thereof comprising a vertical trackway, a load supporting platform adapted to be moved within said trackway, a motor for elevating the load platform, a motor supporting platform carried by and positioned above the truck platform, and a member extending from the motor platform to the upper part of the upright frame.

5. In combination with an automobile truck having load elevating means associated therewith, a load-receiving member comprising a substantially L-shaped member, the vertical portion thereof comprising a substantially rectangular channel beam frame having rollers at the four corners thereof and a plate secured thereto, and the horizontal portion comprising a plate resting on two arms projecting from said vertical portion.

6. The combination with a four wheel portable truck, of a low height platform, an upright frame rigidly secured at one end thereof, a battery box at the other end thereof, an elevating platform slidably mounted in said frame, hoisting mechanism intermediate the frame and the battery box, said mechanism being supported above the truck platform and below the top of the upright frame.

7. The combination with an automobile truck, of an upright rectangular channel beam frame secured near its lower end to the rear end of the truck frame, a load receiving member adapted to be supported and moved vertically within said channel beam frame, said load-receiving member comprising a horizontal platform having a frame extending upwardly from one edge of the platform, said last named frame having rollers adapted to travel within the upright channel beams of the frame first mentioned, and having a top and bottom cross rail, means including a flexible member connected to said truck and said load-supporting member for raising and lowering the latter, and means adapted to be engaged by the facing edges of said cross rails to disconnect the raising means.

8. In combination with an automobile truck elevator, an upright frame having channel beam side members, a load support adapted to be moved up and down said frame, said support comprising a horizontal platform and a frame projecting upwardly from one edge of the platform, said last mentioned frame having horizontal buffer members projecting therefrom, and having wheels at each of its four corners adapted to engage the inner faces of the flanges of the side channel beams, and rollers mounted on axes perpendicular to the axes of the wheels adapted to engage the inner faces of the web portions of said channel beams.

9. The combination with a truck, of an upright frame secured at one end thereof, a load supporting member movably carried by the frame, hoisting means for said member, said means being carried at the other end of the truck, a member pivoted to the frame and interposed into the path of the load supporting member, and means connecting the pivoted member with the hoisting means.

10. In combination, a portable four wheeled truck, a low height platform thereon, said truck having a pair of driving wheels and a pair of guide wheels, said drive wheels having a larger diameter than the guide wheels, a battery box positioned over the drive wheels and at one end of the truck, an upright frame rigidly secured to the other end of the truck and adjacent the guide wheels, a load platform movable vertically within said frame, hoisting mechanism comprising an electric motor for moving said load platform, and means for supporting the hoisting mechanism above the truck platform, said means being positioned intermediate the frame.

11. In combination, a truck, a vertical frame thereon, a platform movable within the frame, means for moving the platform, said platform having a horizontal and vertical portion, a plate on the vertical portion, and horizontal buffer members carried by the plate and projecting outwardly therefrom.

In testimony whereof, I hereunto affix my signature.

CLYDE E. COCHRAN.